United States Patent [19]
Sauer

[11] 3,808,903
[45] May 7, 1974

[54] GEAR SHIFTING ASSEMBLY FOR CHANGE SPEED TRANSMISSIONS

[75] Inventor: Joseph Sauer, Schwieberdingen, Germany

[73] Assignee: Robert Bosch GmbH, Stuttgart, Germany

[22] Filed: Sept. 8, 1972

[21] Appl. No.: 287,429

[30] Foreign Application Priority Data
Sept. 13, 1971 Germany.......................... 21456677

[52] U.S. Cl..................................... 74/335, 92/138
[51] Int. Cl............................ F16h 5/06, F01b 9/00
[58] Field of Search...................... 74/335, 364, 753; 192/109 F; 92/62, 65, 138

[56] References Cited
UNITED STATES PATENTS

| | | | |
|---|---|---|---|
| 2,931,237 | 4/1960 | Backus................................ | 74/335 |
| 2,974,766 | 3/1961 | Perkins et al...................... | 74/335 X |
| 3,376,895 | 4/1968 | Pray.................................. | 92/138 X |
| 3,570,636 | 3/1971 | Franz et al...................... | 74/335 UX |
| 3,664,470 | 5/1972 | Beech.............................. | 74/335 X |

*Primary Examiner*—Arthur I. McKeon
*Attorney, Agent, or Firm*—Michael S. Striker

[57] ABSTRACT

A gear shifting assembly for changing the speed positions of a transmission in an automotive vehicle has a hydraulic gear selector motor whose piston rod is normal to the piston rod of a hydraulic gear shifting motor. The cylinder of the gear shifting motor has two chambers one of which receives pressurized fluid to engage a selected gear and the other of which receives pressurized fluid to disengage a gear. The flow of fluid to and from the two chambers is controlled by a twin check valve which has two discrete one-way valves, one for each chamber and two flow restrictors each connected in parallel with a different one-way valve. When the pressure of fluid in one of the chambers rises to a preselected value, the corresponding one-way valve opens the other one-way valve to allow for practically unimpeded flow of fluid from the other chamber.

10 Claims, 5 Drawing Figures

GEAR SHIFTING ASSEMBLY FOR CHANGE SPEED TRANSMISSIONS

CROSS-REFERENCE TO RELATED APPLICATIONS

The gear shifting assembly of the present invention constitutes an improvement over and a further development of gear shifting assemblies disclosed in the commonly owned copending application Ser. No. 250,956 filed May 8, 1972 by Espenschied et al., and in the commonly owned copending application Ser. No. 277,928 filed Aug. 4, 1972 by Espenschied.

BACKGROUND OF THE INVENTION

The present invention relates to gear shifting assemblies for remote-control operated change speed transmissions, and more particularly to improvements in gear shifting assemblies of the type wherein the output element of a fluid-operated gear selector motor is preferably normal to the output element of a gear shifting motor. Still more particularly, the invention relates to improvements in a gear shifting assembly of the type wherein the actuation of gear selector and gear shifting motors takes place in response to signals furnished by an electronic control unit. A suitable control unit is disclosed in the commonly owned copending application Ser. No. 162,339, now U.S. Pat. No. 3,756,358 filed July 14, 1971.

Pat. No. 2,137,961 to Vorech discloses a hydraulically operated gear shifting or gear changing assembly wherein the valves which control the flow of pressurized fluid to and from the gear selector and gear shifting motors are operated by hand. In order to shift into a different gear, the valves are actuated to admit pressurized fluid first to the gear selector motor and thereupon to the gear shifting motor to engage the gear which has been chosen by the selector motor. The fluid pressure in the gear shifting motor rises abruptly and the patented assembly is not provided with any means for influencing such buildup of fluid pressure. This is undesirable because the synchronizing unit of the transmission does not have enough time to perform its function prior to actual shifting into the chosen gear.

SUMMARY OF THE INVENTION

An object of the invention is to provide a gear shifting assembly wherein the buildup of fluid pressure in the gear shifting motor can be influenced and regulated with a view to allow for orderly operation of the synchronizing unit in the change speed transmission.

Another object of the invention is to provide for a gradual buildup of fluid pressure in the gear shifting motor so as to insure that the buildup is not completed within an interval which is shorter than that necessary for proper operation of the synchronizing unit.

A further object of the invention is to provide a novel system of flow controlling devices which determine the rate of fluid admission into and the buildup of fluid pressure in the gear shifting motor of the gear shifting assembly.

An additional object of the invention is to provide a gear shifting assembly which is constructed and operates in such a way that it eliminates the likelihood of damage to the synchronizing unit and/or other components of the change speed transmission during shifting into a selected gear or during disengagement of a gear.

The invention resides in the provision of a gear shifting assembly for changing the speed positions of a transmission, particularly an electronically controlled transmission in an automotive vehicle. The shifting assembly comprises a gear selector motor, a source of pressurized fluid, and a fluid-operated gear shifting motor having cylinder means which defines two discrete chambers one of which receives fluid during engagement of a selected gear and the other of which receives fluid during disengagement of a gear, piston means movably received in the cylinder means between the two chambers, and gear shifting output means connected with the piston means and preferably constituting an elongated piston rod which is normal to the output means of the gear selector motor. The gear shifting assembly further comprises first and second conduit means for respectively connecting the source of pressurized fluid with the first and second chambers of the cylinder means, and novel means for regulating the flow of fluid in the first and second conduit means. The regulating means comprises first and second one-way valve means which are respectively installed in the first and second conduit means, and first and second flow restrictor means which are respectively connected in parallel with the first and second one-way valve means.

In accordance with a more specific feature of the invention, the regulating means further comprises pressure transmitting means which connects at least one of the chambers with the one-way valve means for the other chamber to thus effect an opening of the one-way valve means for the way valve means for the other chamber when the pressure of fluid in the one chamber rises to a predetermined value.

The novel features which are considered as characteristic of the invention are set forth in particular in the appended claims. The improved gear shifting assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
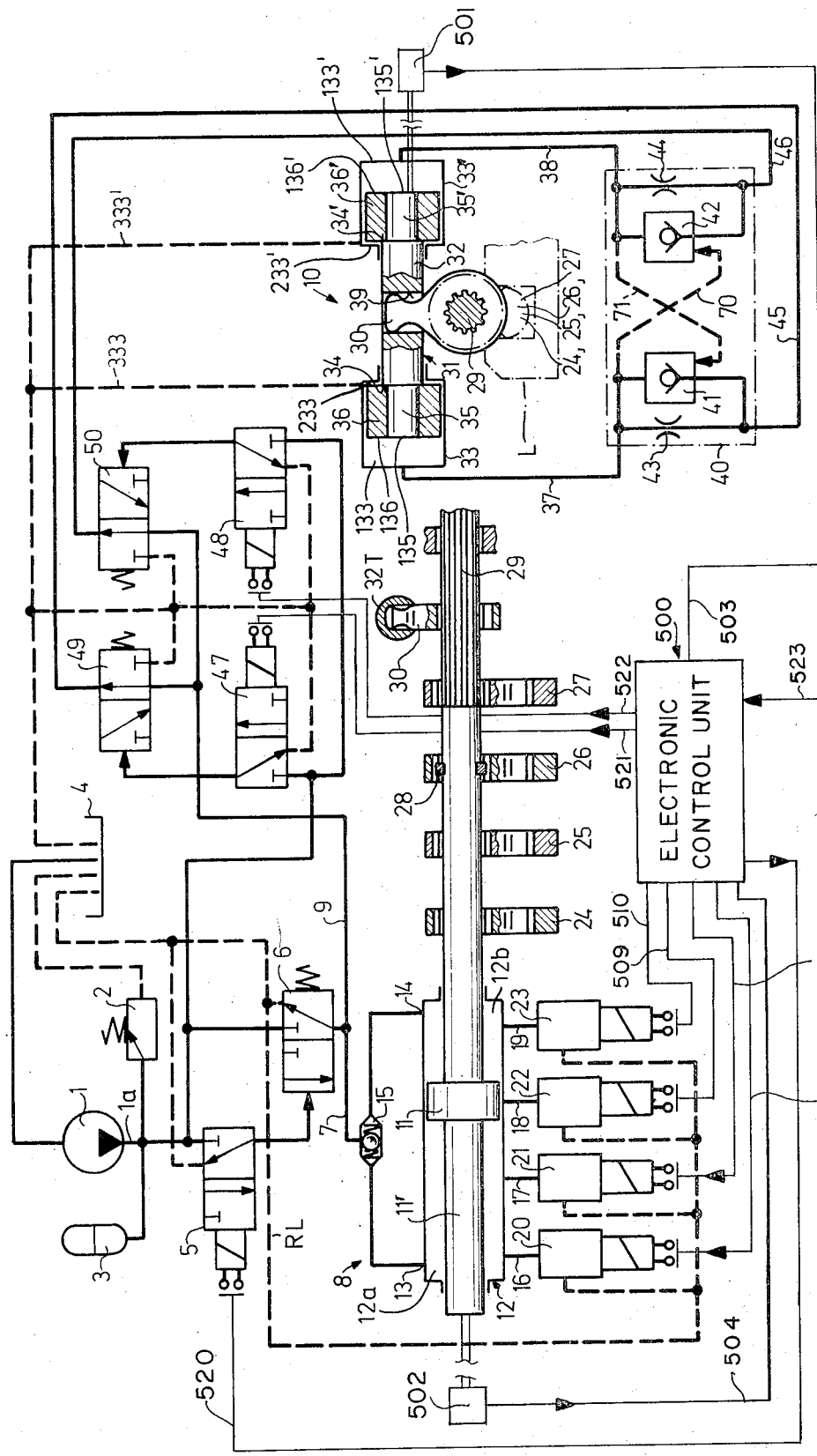
FIG. 1 is a schematic partly sectional view of a gear shifting assembly which embodies the invention.

FIG. 1 shows a gear shifting or gear changing assembly which comprises four main components, namely, a source 1–4 of pressurized hydraulic fluid, a gear selector motor 8 with associated valves 15, 20–23, a gear shifting motor 10 with associated valves 41, 42 and 47–50 and an electronic control unit 500 which serves to produce shifting signals or pulses for setting the change speed transmission to a selected speed position.

The source of pressurized fluid includes a motor-driven hydraulic pump 1 which can draw fluid from a reservoir or tank 4, a relief valve 2 which opens automatically when the pressure of fluid at the outlet 1a of pump 1 reaches a predetermined value, and an accumulator 3 which is connected with the pump outlet 1a and can compensate for eventual fluctuations in fluid pressure. The accumulator 3 also serves as an auxiliary source of pressurized fluid. The pump outlet 1a is connected with the inlet of a shutoff valve 6 which is controlled by an electromagnetic pilot valve 5. The valve 5 is actuatable in response to signals which are transmitted from the electronic control unit 500 via condutor 520. The outlet of the shutoff valve 6 is connected with the gear selector motor 8 by means of a first pressure line 7 and with the gear shifting motor 10 by a second pressure line 9.

The gear selector motor 8 is a hydraulic motor having a double-acting cylinder 12, a piston 11, and an elongated piston rod 11' which constitutes the output element of the motor 8 and is rigid with the piston 11. The pressure line 7 contains a distributor valve 15 having two outlets connected with ports 13, 14 which respectively admit pressurized fluid to the left-hand and right-hand chambers 12a, 12b of the cylinder 12. The construction of the valve 15 is such that it connects the pressure line 7 with that one of the chambers 12a, 12b wherein the pressure of fluid exceeds the fluid pressure in the other chamber. Thus, if the fluid pressure in chamber 12a decreases below that in the chamber 12b, the chamber 12b receives pressurized fluid from the outlet 1a by way of the shutoff valve 6, pressure line 7, distributor valve 15 and port 14 whereby the piston 11 moves the piston rod 11' in a direction to the left, as viewed in FIG. 1. A suitable distributor valve is disclosed in the commonly owned copending application Ser. No. 217,061 filed Jan. 11, 1972 by Espenschied et al.

The cylinder 12 of the gear selector motor 8 is further provided with four outlets 16, 17, 18, 19 which are respectively controlled by normally closed electromagnetic shutoff valves 20, 21, 22, 23. When the electronic control unit 500 furnishes a signal via one of the conductors 507, 508, 509, 510 to open one of the valves 20–23, the respective outlet 16, 17, 18 or 19 is connected with the tank 4 by a return line RL. The piston 11 can seal the outlet which communicates with the return line RL to thus terminate the outflow of hydraulic fluid from the respective chamber 12a or 12b.

The right-hand portion of the piston rod 11' extends through and is rotatable in the bores of four coaxial shifting members or fingers 24, 25, 26 and 27 which form part of the change speed transmission for an automotive vehicle. This portion of the piston rod 11' is provided with at least one coupling or displacing element 28 which can be received in a selected shifting finger to thereby couple the selected finger for rotation with the piston rod 11'. For example, the shifting fingers 24–27 may be provided with internal splines and the coupling element 28 may constitute a key which engages the splined portion of the selected shifting finger to thereby insure that the selected finger can be rotated about the axis of the piston rod 11' in response to actuation of the gear shifting motor 10. Each of the shifting fingers 24–27 can move a discrete link L which, in turn, can move a discrete shifter fork (not shown) in the speed transmission. Each shifter fork straddles a sleeve or muff which can shift the corresponding speed gear of the transmission.

The right-hand end portion 29 of the piston rod 11' constitutes a splined shaft which is movable axially of but cannot rotate in a tilting box 30 here shown as a one-armed lever which can be pivoted by the gear shifting motor 10.

The gear shifting motor 10 comprises a composite cylinder having two spaced-apart coaxial sections 33, 33', a piston 31 which includes two cylindrial portions 35, 35', and a piston rod 32 which is rigid with and is located between the piston portions 35, 35'. The piston rod 32 has a centrally located cutout or recess 39 for a preferably spherical arm of the lever 30. For the sake of clarity, the motor 10 is shown in the plane of FIG. 1; in actual use, the piston rod 32 (which constitutes the output element of the motor 10) is located at right angles to the piston rod 11' (see the true position 32T of the piston rod 32 above the splined shaft 29 of the piston rod 11'). The position of the piston rod 32 is monitored by a switch 501 which transmits signals to the control unit 500 via conductor 503.

The cylinder sections 33, 33' respectively define first and second cylinder chambers 133, 133' which are located at the opposite axial ends of the piston 31, and these cylinder sections further define relieved additional or auxiliary chambers 233, 233' which are connected with the tank 4 by return lines 333, 333'. The cylinder section 33 contains an annular sealing member 36 which is disposed between the chambers 133, 233 and is slidable on the piston portion 35. When the piston 31 moves in a direction to the left, as viewed in FIG. 1, an annular shoulder 34 between the piston rod 32 and piston portion 35 causes the sealing member 36 to move into the chamber 133 which is connected with a supply conduit 37 for admission or evacuation of hydraulic fluid. The member 36 is in sealing engagement with but is slidable along the internal surface of the cylinder section 33 and the external surface of the piston portion 35. A similar annular sealing member 36' is provided in the cylinder section 33' and can be entrained into the chamber 133' by an annular shoulder 34' between the piston rod 32 and piston portion 35'. The chamber 133' is connected with a supply conduit 38 for admission or evacuation of hydraulic fluid.

The areas of the end faces 135, 135' of the piston portions 35, 35' are assumed to be respectively identical with the areas of annular end surfaces 136, 136' of the sealing members 36, 36'. The end face 135 and the end surface 136 are adjacent to the chamber 133; the end face 135' and the end surface 136' are adjacent to the chamber 133'.

The regulating means which controls the flow of hydraulic fluid into and from the chambers 133, 133' by way of the respective conduits 37, 38 includes a twin check valve system 40 having two one-way ball valves 41, 42 and two flow restrictors 43, 44 which are respectively connected in parallel with the valves 41, 42. The valve 41 and flow restrictor 43 can admit fluid from a supply conduit 45 into the conduit 37 for the chamber 133 or vice versa, and the parts 42, 44 can admit fluid from a supply conduit 46 into the chamber 133' by way of the conduit 38 or vice versa. The conduits 45, 46 are respectively connected with the pressure line 9 by shutoff valves 49, 50 which are respectively controlled by electromagnetic pilot valves 47, 48. The valves 47, 48 are respectively connected with the control unit 500 by conductors 521, 522.

The one-way valves 41, 42 normally prevent the flow of fluid from the conduits 37, 38 to the conduits 45, 46.

The broken lines 70, 71 respectively indicate pressure-transmitting connections from the valve 41 to the valve 42 and from the valve 42 to the valve 41. The valve 41 opens when the pressure of fluid in the chamber 133' rises to a predetermined value, and the valve 42 opens when the pressure of fluid in the chamber 133 reaches a predetermined value.

The operation is as follows:

When the driver of the automotive vehicle decides to change the speed position of the transmission, he transmits an appropriate signal to the input 523 of the electronic control unit 500 to initiate a series of successive operations including disengaging the clutch (not shown), disengaging the previously used speed gear, selecting the desired speed gear, electronic synchronization, engaging the selected speed gear, and engaging the clutch. The assembly of FIG. 1 effects the selection and engagement of the selected speed gear and disengagement of a previously used gear.

A signal from the electronic control unit 500 via conductor 507, 508, 509 or 510 energizes one of the shutoff valves 20-23, for example, the shutoff valve 21, so that the left-hand chamber 12a of the cylinder 12 in the gear selector motor 8 is free to communicate with the tank 4 by way of the outlet 17 and return line RL. The motor of the pump 1 is on and the shutoff valve 6 is open so that the distributor valve 15 automatically connects the pressure line 7 with that chamber (12b) wherein the pressure is higher than in the other chamber (12a which is connected with the tank 4). The piston 11 is caused to move toward the outlet 17 and is braked due to rapidly rising fluid pressure in the chamber 12a. The piston 11 comes to a halt when it seals the outlet 17 from the chambers 12a and 12b. The pressure in the chamber 12a then equals the pressure in chamber 12b whereby the distributor valve 15 reassumes its neutral position and seals the pressure line 7 from the ports 13 and 14. When the piston 11 seals the outlet 17, the piston rod 11' maintains its coupling element 28 in torque transmitting engagement with the shifting finger 25. The piston rod 11' is free to move axially of the lever 30 due to the provision of axially parallel splines on its end portion 29.

Figure 2A:
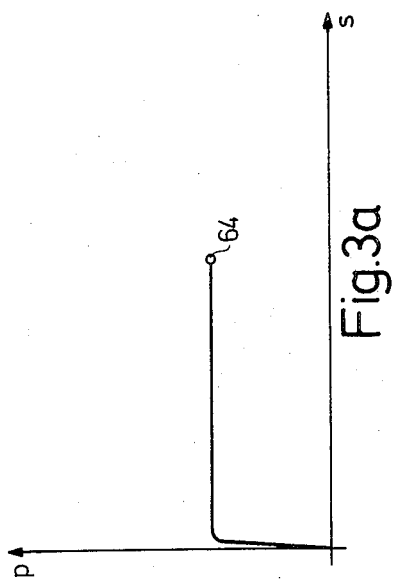
FIG. 2a is a diagram showing the relationship between changes in fluid pressure and the extent of movement of output element of the gear shifting motor during engagement of a selected gear.

The electronic control unit 500 receives a signal via conductor 504 from a switch 502 which monitors the position of the piston rod 11', and the control unit 500 thereupon transmits a signal which results in actuation of the gear shifting motor 10. Such signal is transmitted via conductor 521 or 522 and causes one of the pilot valves 47, 48 to open the associated shutoff valve 49, 50 (for example, the valve 49). The pressurized fluid is admitted from the line 9 into the supply conduit 45 and flows through the one-way valve 41 and flow restrictor 43 into the conduit 37 and thence into the cylinder chamber 133. Prior to opening of the shutoff valve 49, the piston 31 of the gear shifting motor 10 is assumed to occupy the neutral position shown in FIG. 1. Thus, the sealing member 36 in the cylinder section 33 dwells in its rightmost position and its end surface 136 is flush with the end face 135 of the piston portion 35. In order to move the piston 31 in a direction to the right, as viewed in FIG. 1, the fluid which is admitted into the cylinder chamber 133 must act against the end face 135 whereby the piston portion 35 slides relative to the sealing member 36 and the volume of the chamber 133 increases by a value corresponding to the volume of space in the sealing member 36 which is evacuated by the piston portion 35. At the same time, the piston portion 35' and the sealing member 36' (which is entrained by the annular shoulder 34') must expel from the chamber 133' a body of fluid having a volume which is two times that of fluid flowing into the chamber 133. This is due to the fact that the area of the end face 135' equals the area of the end surface 136'. Since the one-way valve 42 normally prevents the flow of fluid from the chamber 133' and conduit 38 into the conduit 46 (which is then connected with the tank 4 by way of the shutoff valve 50), the relatively large quantity of fluid which leaves the chamber 133' must be evacuated by way of the flow restrictor 44. The fluid pressure rise in chamber 133 which is due to flow restricting action at 44 is illustrated in FIG. 2a. The distance $s$ covered by the piston 31 and piston rod 32 is measured along the abscissa and the pressure $p$ of fluid which flows into the chamber 133 is measured along the ordinate. At first, the pressure of fluid rises very rapidly and thereupon remains constant to the point 60 shown in FIG. 2a. The point 60 is reached when the synchronizing unit of the transmission is actuated. Due to mechanical resistance which is thereby offered to further pivoting of the lever 30 by the piston rod 32, the pressure of fluid rises between 60 and 61 to a value at which the pressure transmitting connection 70 causes the one-way valve 42 to open so that the pressure of fluid thereupon remains constant (see the stretch of the curve between the points 61 and 62 in FIG. 2a). The synchronizing operation is terminated at 61 and from then on, the pressure of fluid which is being expelled from the chamber 133' (by way of the flow restrictor 44 and opened one-way valve 42) remains substantially constant. This insures that the freshly synchronized gear can be rapidly engaged while the piston 31 covers the distance between 61 and 62. At 62, the engagement of the freshly selected gear is completed.

Figure 2B:
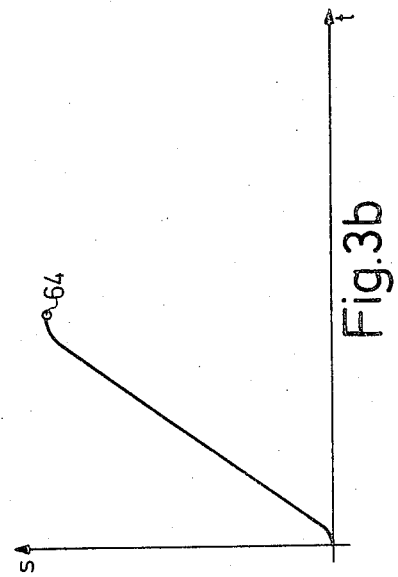
FIG. 2b is a similar diagram showing the relationship between time and the distance covered by output element of the gear shifting motor during engagement of a selected gear.

FIG. 2b is a diagram wherein the time $t$ is measured along the abscissa and the distance $s$ covered by the piston 31 and piston rod 32 is measured along the ordinate. It will be noted that, in the absence of the connection 70 which opens the one-way valve 42 to permit practically unimpeded outflow of fluid from the chamber 133' upon completed synchronization, the time required for engagement of the selected speed gear would be much longer (see the broken-line portion of the curve between the points 61 and 63). Thus, the interval which is required for engagement of a selected gear in the absence of the improved regulating system for the gear shift motor 10 is about two times the interval which elapses in the gear shifting assembly of the present invention.

Figure 3A:
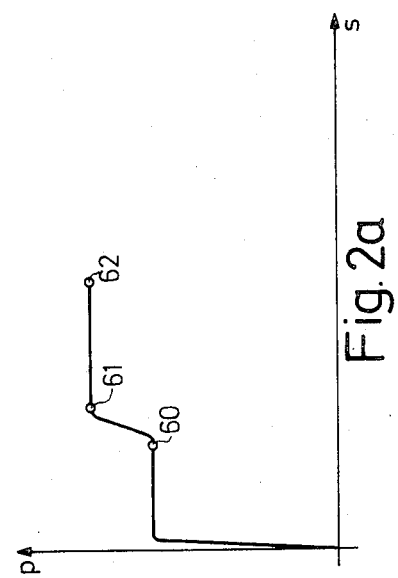
FIG. 3a is a diagram showing the relationship between changes in fluid pressure and the extent of movement of output element of the gear shifting motor during disengagement of a gear.
Figure 3B:
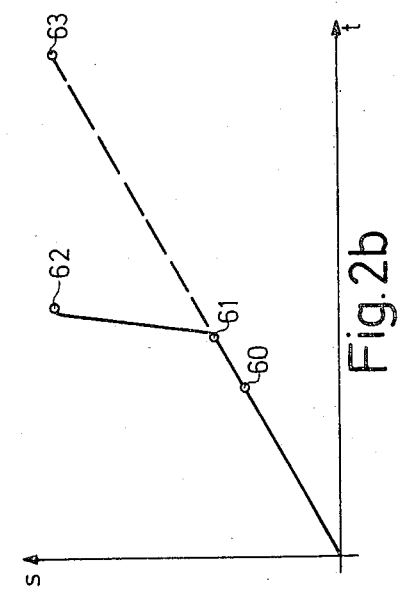
FIG. 3b is a diagram showing the relationship between time and the extent of movement of output element of the gear shifting motor during disengagement of a gear.

The diagrams of FIGS. 3a and 3b illustrate the changes in fluid pressure $p$, the distance $s$ covered by the piston 31 and piston rod 32, and the intervals of time t which elapse during disengagement of a gear. Such disengagement is initiated by opening of the shutoff valve 50 in response to a signal from the electronic control unit 500 via conductor 522 to the corresponding pilot valve 48. The shutoff valve 50 then allows pressurized fluid to flow from the line 9 into the conduit 46. Such fluid can flow into the chamber 133' by way of the flow restrictor 44 as well as through the automatically opened valve 42. The piston 31 and the sealing member 36' are assumed to dwell in their right-hand end positions and the sealing member 36 dwells in the illustrated position. Consequently, the quantity of fluid which must flow into the chamber 133' by way of the conduit 38 is twice the quantity of fluid which is being expelled from the bore of the sealing member 36 in response to leftward movement of piston portion 35 back toward the position shown in FIG. 1. The flow restrictors 43, 44 are adjusted in such a way that the drop in fluid pressure is high in response to a high rate of fluid flow and that the drop in fluid pressure is low when the rate of fluid flow is reduced; therefore, the flow of liquid is slowed down at high flow rates and remains unchanged at lower flow rates. Thus, and since the rate of fluid flow from the chamber 133 is low, the fluid can flow through the flow restrictor 43 (from the chamber 133 into the conduit 45 which is then connected with the tank 4 by way of the valve 49) by meeting very little resistance or no resistance at all. Consequently, the pressure of fluid which develops during disengagement of a speed gear is lower than during engagement of a freshly selected speed gear; therefore, the pressure transmitting connection 71 from the one-way valve 42 to the one-way valve 41 remains ineffective and the valve 41 continues to block the flow of fluid from the conduit 37 into the conduit 45. The disengagement of the gear is terminated at the point 64 of the curve shown in FIG. 3a; the piston rod 32 then reassumes the neutral position of FIG. 1.

An important advantage of the twin check valve 40 is that it can control the buildup of fluid pressure during disengagement of a gear as well as during engagement of a gear which is chosen by the gear selector motor 8. Thus, the piston rod 32 can be moved at a controlled speed to allow for satisfactory operation of the synchronizing unit in the change speed transmission. Once the synchronizing operation is completed, the valve 40 allows for rapid engagement of the selected gear (by opening the one-way valve 42).

It is clear that the improved gear shifting assembly can operate properly with any other suitable gear selector motor. Also, the ratio of the areas of end face 135, 135' to the areas of end surfaces 136, 136' can be changed if it should become necessary to resort to a different control characteristic.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a gear shifting assembly for changing the speed positions of a transmission, a combination comprising a control unit actuatable to transmit a plurality of signals; a gear selector motor operable in response to signals from said control unit; a source of pressurized fluid; a fluid-operated gear shifting motor including cylinder means having first and second chamber, piston means movably received in said cylinder means between said chambers, and gear shifting output means connected with said piston means; first and second conduit means for respectively connecting said source with said first and second chambers; a plurality of valves operable in response to signals from siad control unit to admit fluid from said source into a selected one of said conduit means; and means for regulating the flow of fluid in said conduit means, including first and second one-way valve means respectively provided in said first and second conduit means and first and second flow restrictor means respectively connected in parallel with said first and second one-way valve means.

2. A combination as defined in claim 1, further comprising pressure transmitting means for connecting one of said chambers with the one-way valve means in the conduit means for the other chamber to thus effect an opening of said last mentioned valve means in response to a predetermined pressure rise in said one chamber.

3. A combination as defined in claim 1, wherein each of said valve means is arranged to normally block the flow of fluid from the respective chamber.

4. A combination as defined in claim 1, wherein said valve means and said flow restrictor means together constitute a twin check valve wherein the one-way valve means in at least one of said conduit means is arranged to open in response to a predetermined pressure rise in the other conduit means.

5. A combination as defined in claim 1, wherein said output means is a piston rod and said piston means includes two spaced-apart portions provided at the ends of said piston rod, said cylinder means having first and second sections respectively receiving said first and second piston portions and respectively defining said first and second chambers, each of said sections further having a relieved additional chamber and said gear shifting motor further comprising first and second annular sealing members respectively located in said first and second cylinder sections between said first and second chambers and the respective additional chambers.

6. A combination as defined in claim 5, wherein said first and second piston portions have first and second end faces respectively adjacent to said first and second chambers, said first and second sealing members respectively having first and second end surfaces respectively adjacent to said first and second chambers, the areas of said first and second end faces being respectively equal to the areas of said first and second end surfaces.

7. A combination as defined in claim 5, wherein each of said sealing members surrounds and is movable axially of the respective piston portion.

8. A combination as defined in claim 1, wherein said plurality of valves include shutoff valves provided in said conduit means between said source and said one-way valve means.

9. A combination as defined in claim 1, wherein said gear selector motor comprises a reciprocable output element which is normal to the output means of said gear shifting motor.

10. A combination as defined in claim 1, wherein said flow restrictor means are arranged to effect a substantial deceleration of fluid in response to a high rate of fluid flow therethrough.

* * * * *